US012222092B2

(12) United States Patent
Zhang

(10) Patent No.: US 12,222,092 B2
(45) Date of Patent: Feb. 11, 2025

(54) LIFTABLE LIGHTING DEVICE

(71) Applicant: Zhongshan Mulan Hardware Lighting Co., Ltd., ZhongShan (CN)

(72) Inventor: Guoling Zhang, ZhongShan (CN)

(73) Assignee: Zhongshan Mulan Hardware Lighting Co., Ltd., XiaoLan Town (CN)

( * ) Notice: Subject to any disclaimer, the term of this patent is extended or adjusted under 35 U.S.C. 154(b) by 0 days.

(21) Appl. No.: 18/647,808

(22) Filed: Apr. 26, 2024

(65) Prior Publication Data

US 2024/0360989 A1 Oct. 31, 2024

(30) Foreign Application Priority Data

Apr. 28, 2023 (CN) ......................... 202321020109.2

(51) Int. Cl.

| | |
|---|---|
| ***F21V 21/36*** | (2006.01) |
| ***F21S 8/06*** | (2006.01) |
| ***F21V 21/008*** | (2006.01) |
| ***F21V 21/03*** | (2006.01) |
| ***F21V 21/16*** | (2006.01) |
| ***F21V 23/00*** | (2015.01) |
| ***F21V 23/06*** | (2006.01) |

(52) U.S. Cl.

CPC .............. *F21V 21/36* (2013.01); *F21S 8/061* (2013.01); *F21V 21/008* (2013.01); *F21V 21/03* (2013.01); *F21V 21/16* (2013.01); *F21V 23/001* (2013.01); *F21V 23/009* (2013.01); *F21V 23/06* (2013.01)

(58) Field of Classification Search

CPC ........ F21V 21/008; F21V 21/03; F21V 21/16; F21V 21/36; F21V 21/38; F21V 23/001; F21V 23/009; F21V 23/06; F21S 8/061

See application file for complete search history.

(56) References Cited

U.S. PATENT DOCUMENTS

| | | | | |
|---|---|---|---|---|
| 4,851,980 A * | 7/1989 | McWilliams | F21V 21/38 | 362/403 |
| 5,519,597 A * | 5/1996 | Tsai | F21V 21/38 | 362/403 |
| 7,311,425 B2 * | 12/2007 | Jervey, III | F21V 27/00 | 362/406 |
| 2008/0074893 A1 * | 3/2008 | Ham, II | F21V 21/38 | 362/403 |

* cited by examiner

*Primary Examiner* — Thomas M Sember

(74) *Attorney, Agent, or Firm* — Meunier Carlin & Curfman LLC

(57) ABSTRACT

A liftable lighting device includes a lamp holder, a lamp body, first and second lamp wire assemblies, a power connection mechanism, and a wire winding mechanism rotatably provided on the lamp holder. The first lamp wire assembly has a first end wound on the wire winding mechanism, and a second end extending away from the lamp holder, with the lamp body suspended thereto. The power connection mechanism includes power connection rings fixedly arranged relative to the lamp holder, and a plate electrode, which has elastic sheet group(s) and is connected to and can rotate with the wire winding mechanism. A control assembly is provided on the lamp holder. The second lamp wire assembly is electrically connected to the power connection rings and the control assembly. The elastic sheet group is electrically connected to the first end of the first lamp wire assembly, and slidably abuts against the power connection rings.

10 Claims, 6 Drawing Sheets

LIFTABLE LIGHTING DEVICE

CROSS REFERENCE TO RELATED APPLICATIONS

The present disclosure claims priority to the Chinese patent application with the filing No. 2023210201092 filed with the China National Intellectual Property Administration on Apr. 28, 2023, and entitled "LIFTABLE LIGHTING DEVICE", contents of which are incorporated herein by reference in their entirety.

TECHNICAL FIELD

The present disclosure relates to the technical field of lighting devices, and particularly to a liftable lighting device.

BACKGROUND ART

Compared with a fixedly arranged ceiling lamp, for an electric liftable lighting device, the height of the lighting device may be conveniently adjusted, without making a professional to climb a ladder to change the height of the lighting device, so that it is easy to clean and maintain the lighting device.

However, during lifting of current electric liftable lighting devices, the liftable lighting devices must be powered off.

For example, the invention patent application with the grant number of CN106678755A discloses a lighting device lifting assembly, including a lamp holder and a lamp holder box which are movably connected with each other, wherein a lifting rope is provided in the lamp holder box, the lamp holder is sleeved over the lifting rope, and lifting of the lifting rope is controlled by a winding motor, so that the lamp holder is liftable relative to the lamp holder box. Thus, when the lamp holder needs to be replaced, the lamp holder is controlled to be separated from and lowered relative to the lamp holder box, so as to facilitate replacement of the lamp holder.

After the replacement of the lamp holder is completed, the lamp holder is controlled to rise and fit relative to the lamp holder box, so that the lamp holder supplies power through the lamp holder box.

That is to say, the existing electric liftable lighting devices can only be powered up at a specific operation position so as to light up the lamps, and during the lifting, or even if the lamps are static but not at the specific operation position, the lamps cannot be lit up.

SUMMARY

The present disclosure aims at providing a liftable lighting device, so as to solve, to a certain extent, the technical problem existing in the prior art that the electric liftable lighting devices only can be lit up at a specific position, and cannot be lit up during the lifting or at other positions.

The present disclosure provides a liftable lighting device, including a control assembly, a lamp holder, a lamp body, a first lamp wire assembly, a second lamp wire assembly, a power connection mechanism and a wire winding mechanism, wherein the wire winding mechanism is rotatably provided on the lamp holder, a first end of the first lamp wire assembly is wound on the wire winding mechanism, and a second end of the first lamp wire assembly extends away from the lamp holder, with the lamp body suspended thereto;

the power connection mechanism includes power connection rings and a plate electrode having an elastic sheet group, the power connection rings and the lamp holder are fixedly arranged relative to each other, and the plate electrode is connected to the wire winding mechanism and can rotate with the wire winding mechanism; and the control assembly is provided on the lamp holder, the second lamp wire assembly is electrically connected to the power connection rings and the control assembly, respectively, the elastic sheet group is electrically connected to the first end of the first lamp wire assembly, and the elastic sheet group slidably abuts against the power connection rings.

In the above technical solution, further, the first lamp wire assembly has a preset number of first lamp wires, and the second lamp wire assembly has the preset number of second lamp wires;

the number of the power connection rings is the preset number, all the power connection rings are provided sequentially with one sleeved over and insulated from another, from inside to outside, and the elastic sheet group includes the preset number of elastic sheets; and the preset number of the second lamp wires are electrically connected to the preset number of the power connection rings in one-to-one correspondence, the preset number of the first lamp wires are electrically connected to the preset number of the elastic sheets in the elastic sheet group in one-to-one correspondence, and the preset number of the elastic sheets in the elastic sheet group abut against the preset number of the power connection rings in one-to-one correspondence.

In any one of the above technical solutions, further, an insulation ring is provided between adjacent power connection rings; and each of the power connection rings is provided with a power connection disk, and the second lamp wire is electrically connected to the power connection disk.

In any one of the above technical solutions, further, the number of the elastic sheet group is multiple, and the multiple elastic sheet groups are sequentially arranged at intervals along a circumferential direction of the power connection rings; and all elastic sheets and the first lamp wires corresponding to the same power connection ring are electrically connected through a circuit on the plate electrode.

In any one of the above technical solutions, further, the liftable lighting device further includes an insulation connection seat, wherein the insulation connection seat includes a first seat portion and a second seat portion;

the first seat portion is connected to the wire winding mechanism, the second seat portion is provided on a side of the first seat portion facing away from the wire winding mechanism, and the plate electrode is connected to the second seat portion;

the insulation connection seat is provided with at least the preset number of threading holes, and the plate electrode is provided with at least the preset number of wiring holes; and end heads of first ends of the preset number of the first lamp wires, after passing through the threading holes, are electrically connected to the circuit of the plate electrode through the preset number of the wiring holes.

In any one of the above technical solutions, further, the wire winding mechanism includes a mounting seat, a reel tube (spool tube) and a positioning rod;

the mounting seat is provided on the lamp holder, the reel tube and the positioning rod are both rotatably connected to the mounting seat, and the positioning rod is provided spaced from a side portion of the reel tube in a radial direction; and the first end of the first lamp wire assembly is wound on the reel tube and is located between the positioning rod and the reel tube, and the second end of the first lamp wire assembly extends away from the lamp holder, with the lamp body suspended thereto.

In any one of the above technical solutions, further, the reel tube is provided with a plurality of circumferential ridges at intervals in an axial direction, so as to obtain, by dividing, the preset number of independent wire winding spaces;

the preset number of the first lamp wires are wound in the preset number of the wire winding spaces in one-to-one correspondence; and along the axial direction of the reel tube, protruding heights of the circumferential ridges are adapted to dimensions of the first lamp wires, and the positioning rod abuts against the circumferential ridges.

In any one of the above technical solutions, further, the wire winding mechanism further includes a tubular motor and a coupling assembly; and the reel tube is hollow, the tubular motor and the coupling assembly are both provided inside the reel tube, the coupling assembly is connected to an inner wall of the reel tube in an anti-rotation manner, and an output shaft of the tubular motor is connected to the coupling assembly in an anti-rotation manner.

In any one of the above technical solutions, further, the wire winding mechanism further includes a threaded rod and a threaded sleeve; and the threaded rod is provided on the mounting seat, an axis of the threaded rod is coaxial with a rotation axis of the reel tube, and the threaded sleeve is screwed to the threaded rod; and the threaded sleeve is connected to the reel tube, so that in the process of rotating with the reel tube, the threaded sleeve drives the reel tube to translate along the threaded rod.

In any one of the above technical solutions, further, the positioning rod includes a positioning shaft, a positioning sleeve and a flexible casing; and the positioning shaft is provided on the mounting seat and is located at the side portion of the reel tube, an axis of the positioning shaft is parallel to a rotation axis of the reel tube, the positioning sleeve is rotatably sleeved over the positioning shaft, and the flexible casing covers a peripheral side wall of the positioning sleeve.

Compared with the prior art, beneficial effects of the present disclosure are as follows.

For the liftable lighting device provided in the present disclosure, by electrically connecting the power connection rings with the control assembly through the second lamp wire assembly, electrically connecting the lamp body with the plate electrode through the first lamp wire assembly, and providing the elastic sheet group of the plate electrode to slidably abut against the power connection rings, electrical connection between the first lamp wire assembly and the second lamp wire assembly is realized through the plate electrode and the power connection rings.

During the rotation of the wire winding mechanism to collect and release the first lamp wire assembly, the plate electrode synchronously rotates with the wire winding mechanism, and the plate electrode always abuts against the power connection rings through the elastic sheet group thereof and slides relative to the power connection rings, so that the control assembly can maintain an electrical connection relationship with the lamp body, thereby ensuring that the lamp body can always be controlled by the control assembly, further ensuring that the lamp body is always lit up and is always electrically controllable.

BRIEF DESCRIPTION OF DRAWINGS

In order to more clearly illustrate technical solutions in embodiments of the present disclosure or the prior art, drawings which need to be used in the description of the embodiments or the prior art will be briefly introduced below. Obviously, the drawings in the following description merely show some embodiments of the present disclosure, and those ordinarily skilled in the art still could obtain other drawings in light of these drawings, without using any inventive efforts.

REFERENCE SIGNS

Figure 1:
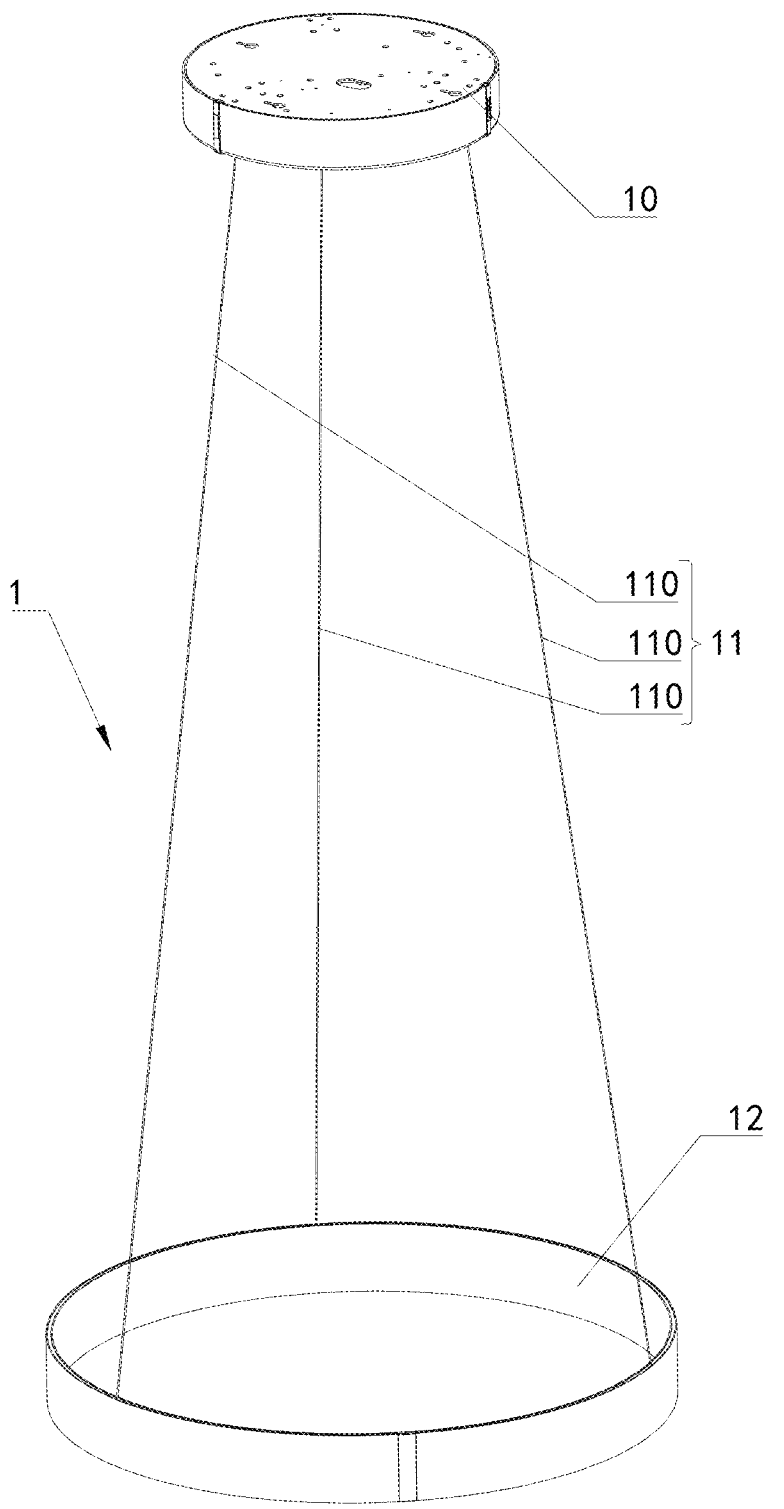
FIG. 1 is a structural schematic view of a liftable lighting device provided in embodiments of the present disclosure.
Figure 2:
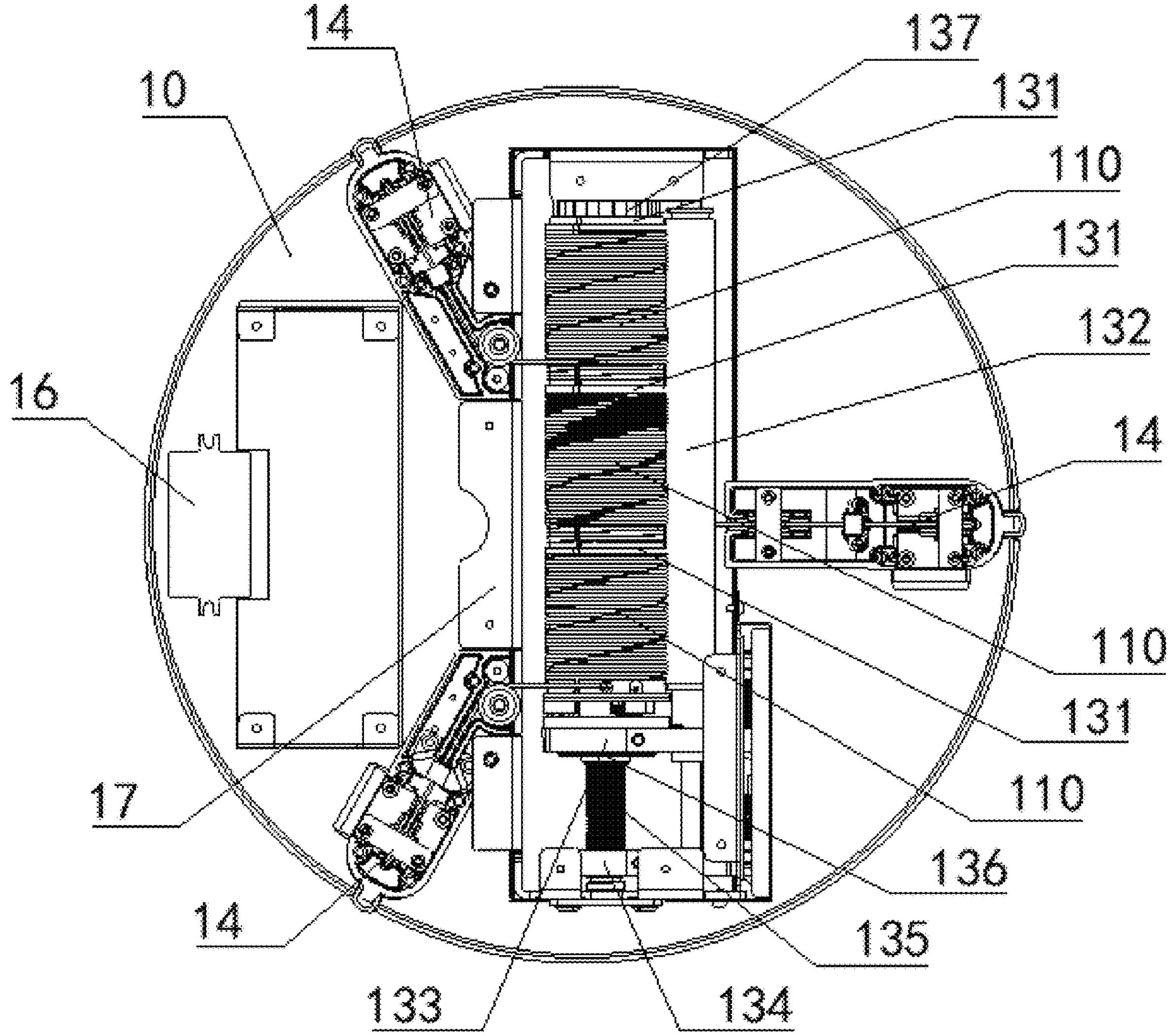
FIG. 2 is a first structural schematic view of a lamp holder provided in embodiments of the present disclosure.
Figure 3:
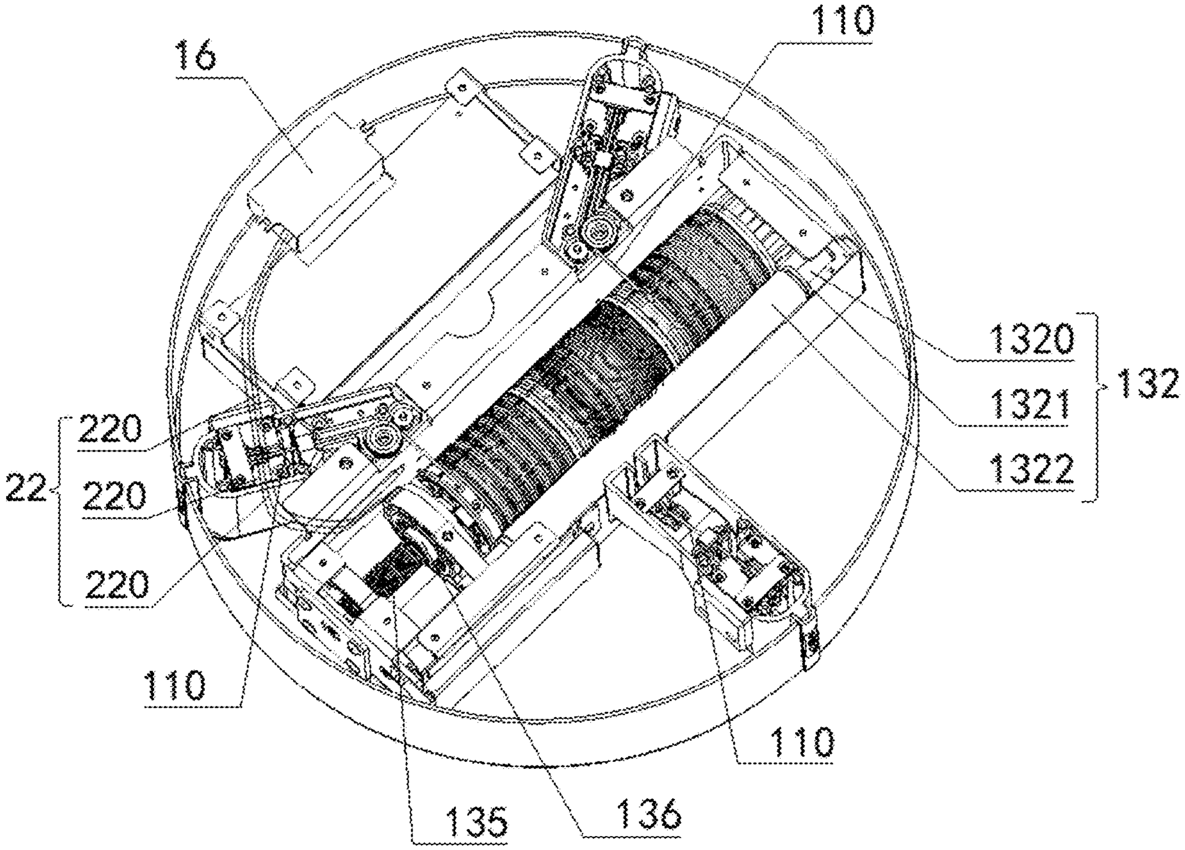
FIG. 3 is a second structural schematic view of a lamp holder provided in embodiments of the present disclosure.
Figure 4:
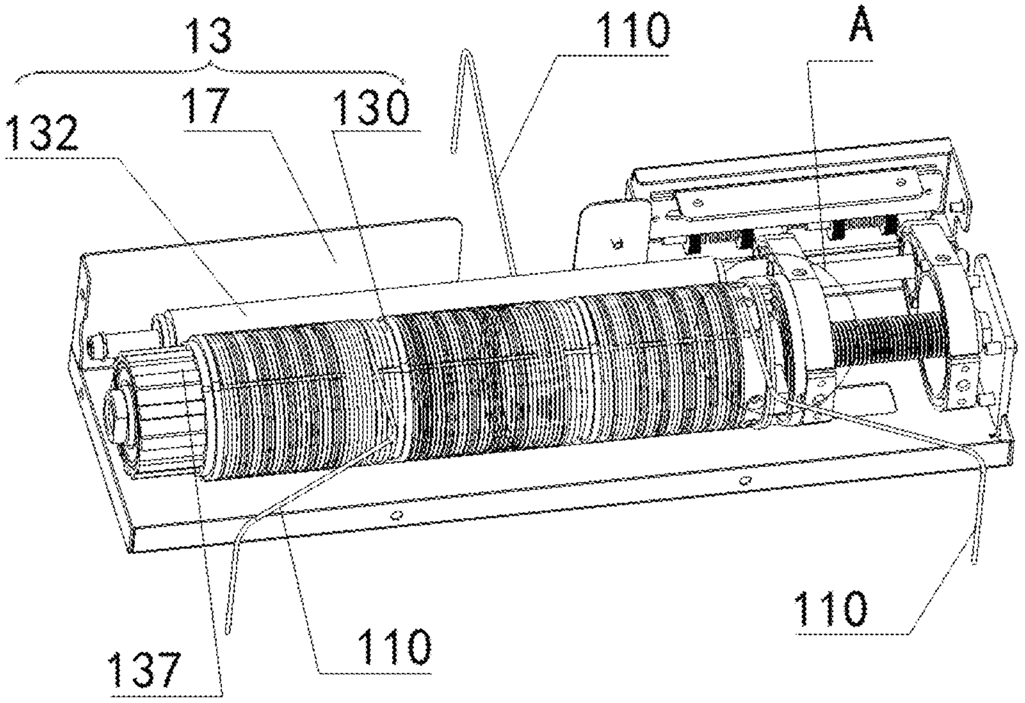
FIG. 4 is a structural schematic view of a wire winding mechanism and a power connection mechanism provided in embodiments of the present disclosure.
Figure 5:
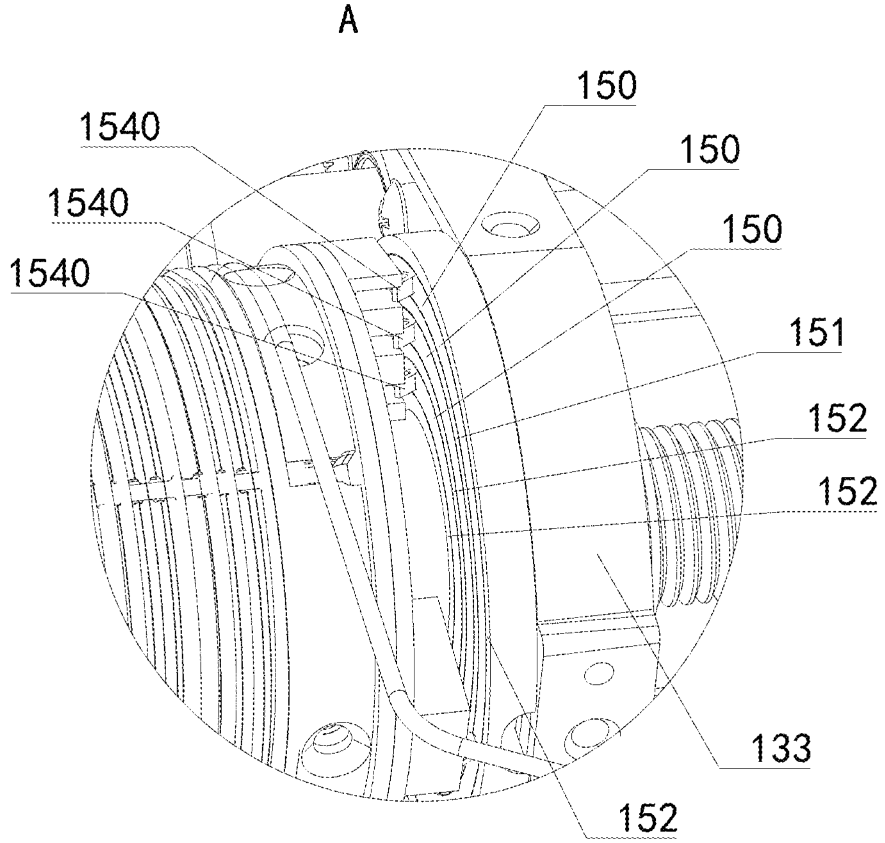
FIG. 5 is a partial enlarged view of part A in FIG. 4.
Figure 6:
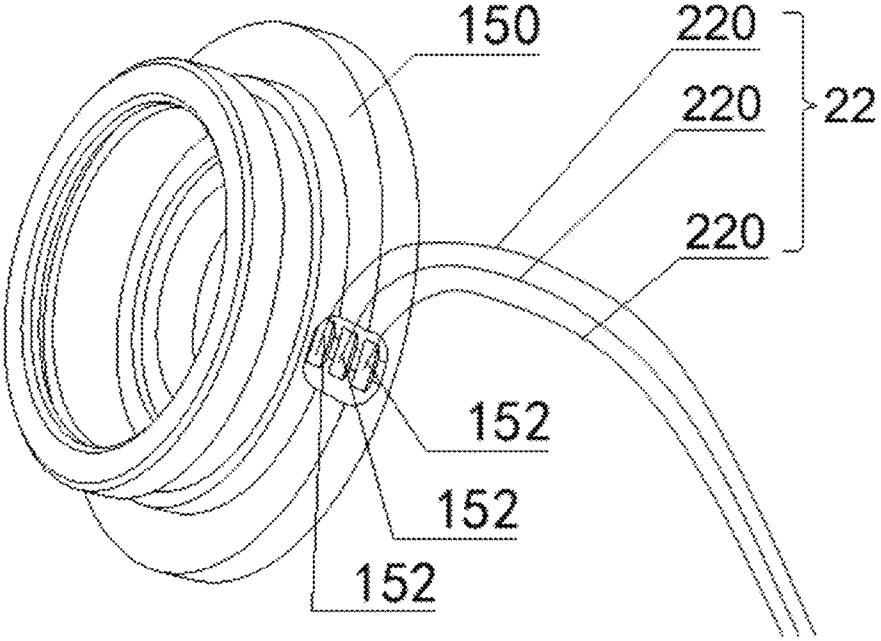
FIG. 6 is a first structural schematic view of a power connection ring of a power connection structure provided in embodiments of the present disclosure.
Figure 7:
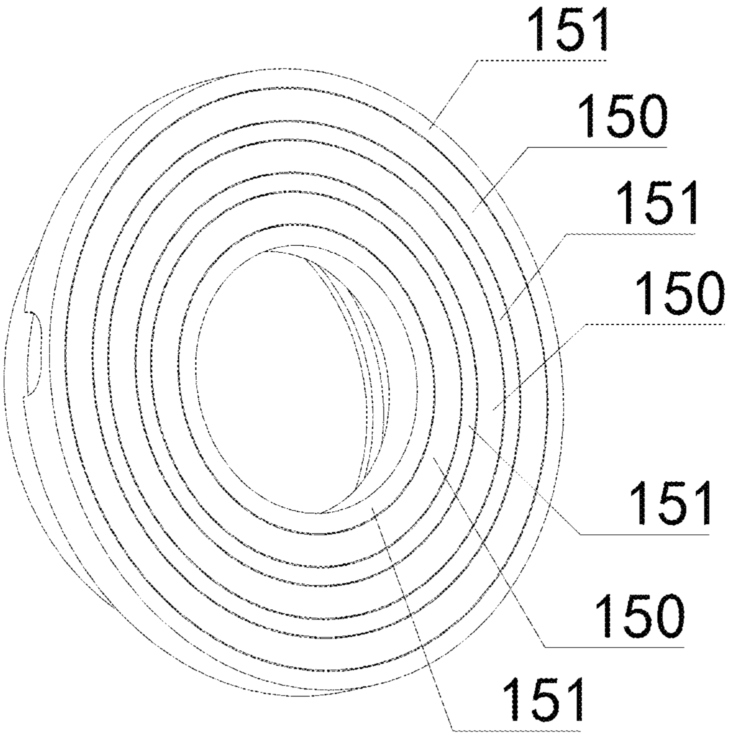
FIG. 7 is a second structural schematic view of a power connection ring of a power connection structure provided in embodiments of the present disclosure.

1—liftable lighting device; 10—lamp holder; 11—first lamp wire assembly; 110—first lamp wire; 22—second lamp wire assembly; 220—second lamp wire; 12—lamp body; 13—wire winding mechanism; 130—reel tube; 131—circumferential ridge; 132—positioning rod; 1320—positioning shaft; 1321—positioning sleeve; 1322—flexible casing; 133—first support seat; 134—second support seat; 135—threaded rod; 136—threaded sleeve; 137—anti-rotation sleeve; 14—guide wheel; 15—power connection mechanism; 150—power connection ring; 151—insulation ring; 152—power connection disk; 153—plate electrode; 1530—wiring hole; 154—elastic sheet group; 1540—elastic sheet; 155—insulation connection seat; 1550—first seat portion; 1551—second seat portion; 1552—threading hole; 16—control assembly; 17—mounting seat.

DETAILED DESCRIPTION OF EMBODIMENTS

The technical solutions of the present disclosure will be clearly and completely described below in conjunction with the drawings. Obviously, some but not all embodiments of the present disclosure are described. Based on the embodiments in the present disclosure, all of other embodiments obtained by those ordinarily skilled in the art without using any inventive efforts shall fall within the scope of protection of the present disclosure.

In the description of the present disclosure, it should be noted that orientation or positional relationships indicated by the terms such as "center", "upper", "lower", "left", "right", "vertical", "horizontal", "inner", and "outer" are based on orientation or positional relationships as shown in the drawings, merely for facilitating the description of the present disclosure and simplifying the description, rather than indicating or implying that related devices or elements have to be in a specific orientation, or configured and operated in a specific orientation, and thus they should not be construed as limitation to the present disclosure. Besides, the terms "first", "second", and "third" are merely for descriptive purpose, but should not be construed as indicating or implying importance in the relativity.

In the description of the present disclosure, it should be noted that, unless otherwise specifically specified and defined, the terms "install", "link", and "connect" should be understood in a broad sense, for example, a connection may be a fixed connection, a detachable connection, or an integrated connection; it may be a mechanical connection or an electrical connection; it may be direct joining or indirect joining through an intermediary, and it also may be inner communicating between two elements. For those ordinarily skilled in the art, specific meanings of the above-mentioned terms in the present disclosure could be understood according to specific circumstances.

Referring to FIG. 1 to FIG. 9, embodiments of the present disclosure provide a liftable lighting device 1, including a lamp holder 10, a lamp body 12, a first lamp wire assembly 11, a second lamp wire assembly 22, a power connection mechanism 15 and a wire winding mechanism 13. In the above, the lamp holder 10 is mounted on a lighting device mounting surface such as a ceiling board, so that by mounting the lamp body 12, the wire winding mechanism 13, the first lamp wire assembly 11 and the second lamp wire assembly 22 relative to the lamp holder 10, mounting of the liftable lighting device 1 relative to the lighting device mounting surface is implemented. The lamp body 12 is used for lighting. For example, the lamp body 12 may be an LED lamp.

The wire winding mechanism 13 is rotatably provided on the lamp holder 10. A first end of the first lamp wire assembly 11 is wound on the wire winding mechanism 13, and a second end of the first lamp wire assembly 11 extends away from the lamp holder 10, with the lamp body 12 suspended thereto. In the above, the first end of the first lamp wire assembly 11 is wound on a reel tube 130, so that collection and release of the first lamp wire assembly 11 is implemented by rotating the reel tube 130. On this basis, the second end of the first lamp wire assembly 11 is provided with the lamp body 12 suspended thereto, and by collecting and releasing the first lamp wire assembly 11, hanging height of the lamp body 12 may be adjusted.

The power connection mechanism 15 includes power connection rings 150 and a plate electrode 153 having an elastic sheet group 154. The power connection rings 150 and the lamp holder 10 are fixedly arranged relative to each other. The plate electrode 153 is connected to the wire winding mechanism 13 and can rotate with the wire winding mechanism 13, so that when the wire winding mechanism 13 drives the first lamp wire assembly 11 to rotate to be collected and released, the plate electrode 153 synchronously rotates with the wire winding mechanism 13, while the power connection rings 150 can be kept in a state of being fixed relative to the lamp holder 10.

The control assembly 16 is provided on the lamp holder 10. The control assembly 16 may include, for example, a controller and a controller base for fixing the controller. The second lamp wire assembly 22 is electrically connected to the power connection rings 150 and the control assembly 16, so that the control assembly 16 may transmit electrical signals to the power connection rings 150 through the second lamp wire assembly 22.

The elastic sheet group 154 of the plate electrode 153 is electrically connected to the first end of the first lamp wire assembly 11, so that the first end of the first lamp wire assembly 11 and the plate electrode 153 both can rotate with the wire winding mechanism 13, and thus the first end of the first lamp wire assembly 11 and the elastic sheet group 154 of the plate electrode 153 are fixedly arranged relative to each other, without accidental entanglement therebetween. On this basis, the elastic sheet group 154 of the plate electrode 153 slidably abuts against the power connection rings 150, so that the elastic sheet group 154 can be always in electrical connection with the power connection rings 150, further the second lamp wire assembly 22 can be electrically connected to the first lamp wire assembly 11 all the time through the plate electrode 153 and the power connection rings 150, so that the control assembly 16 can always control the lamp body 12. Moreover, while supplying power to the lamp body 12, the first lamp wire assembly 11 also can serve a load-bearing function of hoisting the lamp body 12.

It can be seen that for the liftable lighting device 1, by electrically connecting the power connection rings 150 with the control assembly 16 through the second lamp wire assembly 22, electrically connecting the lamp body 12 with the plate electrode 153 through the first lamp wire assembly 11, and providing the elastic sheet group 154 of the plate electrode 153 to slidably abut against the power connection rings 150, electrical connection between the first lamp wire assembly 11 and the second lamp wire assembly 22 is realized through the plate electrode 153 and the power connection rings 150. Accordingly, during the rotation of the wire winding mechanism 13 so as to collect and release the first lamp wire assembly 11, the plate electrode 153 synchronously rotates with the wire winding mechanism 13, and the plate electrode 153 always abuts against the power connection rings 150 through the elastic sheet group 154 thereof and slides relative to the power connection rings 150, so that the control assembly 16 can maintain an electrical connection relationship with the lamp body 12, thereby ensuring that the lamp body 12 can always be controlled by the control assembly 16, further ensuring that the lamp body 12 is always lit up and is always electrically controllable, for example, electrically controlled operations such as on and off, luminance adjustment or color adjustment always may be performed.

Optionally, in order to avoid that the electrical connection place (for example, solder joint) between the second end of the first lamp wire assembly 11 and the lamp body 12 suffers force during load bearing, a connection joint between the first lamp wire assembly 11 and the lamp body 12 may be reinforced, so as to ensure stability of supplying power to the lamp body 12.

Optionally, the lamp holder 10 includes a mounting chassis and a cover, a mounting cavity is defined between the cover and the mounting chassis, and the wire winding mechanism 13 is provided in the mounting cavity. Still further, the cover is provided with a wire outlet hole, and the second end of the first lamp wire assembly 11 extends out of the mounting cavity from the wire outlet hole, so that the lamp body 12 is hung outside the lamp holder 10.

Optionally, the lamp holder 10 is further provided with a preset number of guide wheels 14, and a preset number of first lamp wires 110 pass through the preset number of the guide wheels 14 in one-to-one correspondence, so as to adjust and maintain a direction of the first lamp wires 110 as required through the guide wheels 14.

In an optional solution of the present embodiment, the first lamp wire assembly 11 has a preset number of the first lamp wires 110, and the second lamp wire assembly 22 has a preset number of second lamp wires 220. The number of the power connection rings 150 is a preset number, all the power connection rings 150 are provided sequentially with one sleeved over and insulated from another, from inside to outside. The elastic sheet group 154 includes a preset number of elastic sheets 1540. The preset number of the second lamp wires 220 are electrically connected to the preset number of the power connection rings 150 in one-to-one correspondence.

The preset number of the first lamp wires 110 are electrically connected to the preset number of the elastic sheets 1540 in the elastic sheet group 154 in one-to-one correspondence. The preset number of the elastic sheets 1540 in the elastic sheet group 154 abut against the preset number of the power connection rings 150 in one-to-one correspondence.

In this technical solution, the preset number of the first lamp wires 110 are respectively used to be electrically connected to a positive electrode and a plurality of negative electrodes with different functions of the lamp body 12, so as to achieve multi-functional lighting (i.e., multiple lighting functions) of the lamp body 12. The so-called different lighting functions may be distinguished by lit luminance, color and the like of the lamp body 12.

The control assembly 16 is electrically connected to the preset number of the first lamp wires 110 in one-to-one correspondence through the preset number of the second lamp wires 220, and further is electrically connected to the lamp body 12 through the preset number of the first lamp wires 110, thereby realizing switching of lighting modes of the lamp body 12.

Specifically, the preset number of the second lamp wires 220 are electrically connected to the preset number of the power connection rings 150 in one-to-one correspondence, the preset number of the power connection rings 150 are electrically connected to the preset number of the elastic sheets 1540 in the elastic sheet group 154 in one-to-one correspondence, and the preset number of the elastic sheets 1540 in the elastic sheet group 154 are electrically connected to the preset number of the first lamp wires 110 in one-to-one correspondence. Thus, each second lamp wire 220 is electrically connected to a corresponding first lamp wire 110, through one corresponding power connection ring 150 and one corresponding elastic sheet 1540, to form a series circuit, so that the control assembly 16 performs electrical control respectively on the positive electrode and the negative electrodes with different functions of the lamp body 12 through the preset number of different series circuits.

In a specific example, the preset number is three. The first lamp wire assembly 11 includes three first lamp wires 110, the second lamp wire assembly 22 includes three second lamp wires 220, the three power connection rings 150 are provided sequentially with one sleeved over and insulated from another, from inside to outside, and three elastic sheets 1540 in the elastic sheet group 154 abut against the three power connection rings 150 in one-to-one correspondence. The three second lamp wires 220 are electrically connected to the three power connection rings 150 in one-to-one correspondence, and the three first lamp wires 110 are electrically connected to the three elastic sheets 1540 in the elastic sheet group 154 in one-to-one correspondence.

Optionally, the power connection rings 150 are made of metal, for example, the power connection rings 150 are made of copper.

In an optional solution of the present embodiment, in order to avoid short circuit between adjacent power connection rings 150, and ensure power supply safety, an insulation ring 151 is provided between adjacent power connection rings 150, so as to ensure no short circuit between the preset number of the second lamp wires 220.

In an optional solution of the present embodiment, each power connection ring 150 is provided with a power connection disk 152, and the second lamp wire 220 is electrically connected to the power connection disk 152, so that the second lamp wire 220 is electrically connected to the power connection ring 150 through the power connection disk 152, and the power connection disk 152 provides a convenient connection position for the electrical connection of the second lamp wire 220 with the power connection ring 150.

It could be understood that in order to avoid spatial interference between the power connection disk 152 and the sliding elastic sheets 1540, the power connection disk 152 is disposed on a surface of the power connection ring 150 that does not contact the elastic sheets 1540.

Optionally, the second lamp wires 220 are welded to the power connection disk 152, so that the second lamp wires 220 are electrically connected with the power connection disk 152, and further the second lamp wires 220 are electrically connected with the power connection rings 150.

In an optional solution of the present embodiment, the number of the elastic sheet group 154 is multiple, and the multiple elastic sheet groups 154 are sequentially arranged at intervals along a circumferential direction of the power connection rings 150, so that each power connection ring 150 abuts against a plurality of elastic sheets 1540, thereby improving stability of electrical connection between each power connection ring 150 and the plate electrode 153, and further improving stability of electrical connection between a corresponding first lamp wire 110 and a corresponding second lamp wire 220.

Figure 8:
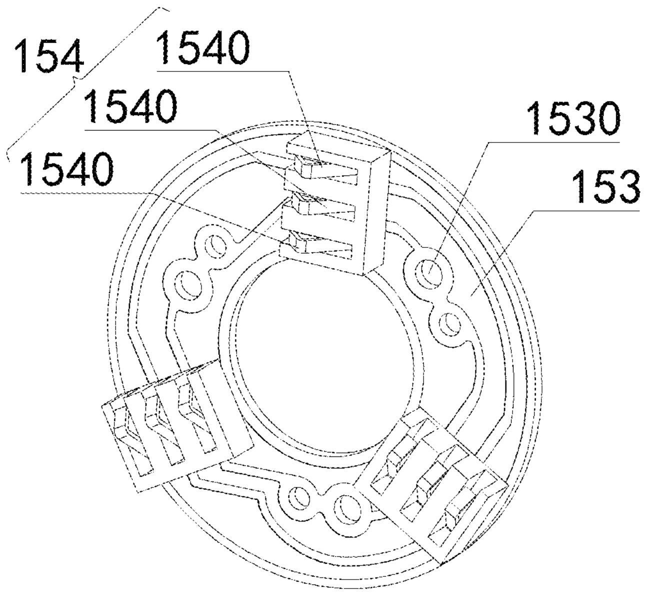
FIG. 8 is a structural schematic view of a plate electrode of a power connection structure provided in embodiments of the present disclosure.
Figure 9:
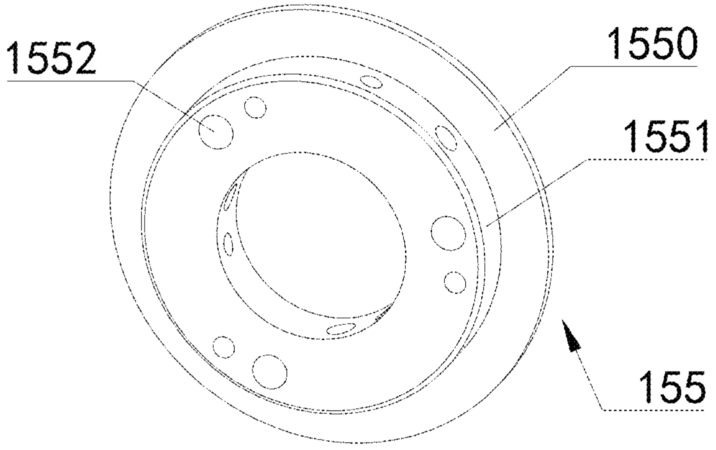
FIG. 9 is a structural schematic view of a connection seat of a power connection structure provided in embodiments of the present disclosure.

As shown in FIG. 8, a case where three elastic sheet groups 154 are provided is shown, and each elastic sheet group 154 includes three elastic sheets 1540 respectively abutting against three different power connection rings 150.

In an optional solution of the present embodiment, all the elastic sheets 1540 and the first lamp wires 110 which are corresponding to the same power connection ring 150 are electrically connected through a circuit on the plate electrode 153. That is to say, the first lamp wires 110 are electrically connected to the circuit on the plate electrode 153, the circuit electrically connected to the first lamp wires 110 is electrically connected to designated elastic sheets 1540, and the designated elastic sheets 1540 slidably abut against a corresponding power connection ring 150.

Optionally, the first lamp wires 110 are electrically connected to a printed circuit on a corresponding plate electrode 153 at specific connection positions of the printed circuit in a manner of inserting, soldering or the like.

In an optional solution of the present embodiment, the liftable lighting device 1 further includes an insulation connection seat 155. The insulation connection seat 155 includes a first seat portion 1550 and a second seat portion 1551. The first seat portion 1550 is connected to the wire winding mechanism 13, so that the insulation connection seat 155 is mounted on the wire winding mechanism 13, and can rotate synchronously with the wire winding mechanism 13.

The second seat portion 1551 is provided on a side of the first seat portion 1550 facing away from the wire winding mechanism 13, and the plate electrode 153 is connected to the second seat portion 1551, thereby mounting the plate electrode 153 on the insulation connection seat 155.

Optionally, the plate electrode 153 and the second seat portion 1551 are fixed by fastener(s).

It may be understood that, the first seat portion 1550 and the second seat portion 1551 are both made of an insulation material.

In an optional solution of the present embodiment, the insulation connection seat 155 is provided with at least a preset number of threading holes 1552, and the plate electrode 153 is provided with at least a preset number of wiring holes 1530. After end heads of first ends of the preset number of the first lamp wires 110 pass through the threading holes 1552, they are electrically connected to the circuit of the plate electrode 153 through the preset number of the wiring holes 1530.

In the above, the threading holes 1552 penetrate the first seat portion 1550 and the second seat portion 1551, such that the end heads of the first ends of the first lamp wires 110 can enter the entire insulation connection seat 155 through the threading holes 1552, and the threading holes can function to fix the preset number of the first lamp wires 110. The end heads of the first ends of the first lamp wires 110, after passing through the insulation connection seat 155, are electrically connected to the wiring holes 1530 in the plate electrode 153 in a manner of inserting, soldering or the like, thereby establishing an electrical connection relationship with the circuit on the corresponding plate electrode 153.

It can be seen that, by providing the insulation seat, the threading holes 1552 and the wiring holes 1530, an electrical connection structure between the first lamp wire assembly 11 and the plate electrode may be simpler and easier to assemble, and after assembly, reliable positioning of each first lamp wire 110 may be realized, so that wiring is neater and more reliable.

In an optional solution of the present embodiment, the wire winding mechanism 13 includes a mounting seat 17, a reel tube 130 and a positioning rod 132. The mounting seat 17 is provided on the lamp holder 10. The reel tube 130 and the positioning rod 132 are both rotatably connected to the mounting seat 17. The positioning rod 132 is provided spaced from a side portion of the reel tube 130 in a radial direction. In other words, the reel tube 130 is rotatably mounted on the lamp holder 10, the positioning rod 132 is rotatably mounted on the lamp holder 10, the positioning rod 132 is located on the side portion of the reel tube 130 in the radial direction, and a wire-passing gap is formed between the positioning rod 132 and the reel tube 130 along the radial direction of the reel tube 130.

The first end of the first lamp wire assembly 11 is wound on the reel tube 130 and is located between the positioning rod 132 and the reel tube 130, and the second end of the first lamp wire assembly 11 extends away from the lamp holder 10, with the lamp body 12 suspended thereto. In the above, the first lamp wire assembly 11 wound on the reel tube 130 is located in the wire-passing gap between the positioning rod 132 and the reel tube 130, that is to say, the positioning rod 132 tightly presses the first lamp wire assembly 11 onto the reel tube 130, so as to avoid detachment of the first lamp wire assembly 11 from the reel tube 130 to cause kinking/enlacement, and ensure that the first lamp wire assembly 11, during collection and release, can maintain a state of being uniformly and regularly wound around the reel tube 130.

In an optional solution of the present embodiment, the reel tube 130 is provided with a plurality of circumferential ridges 131 at intervals in an axial direction, so as to obtain, by dividing, a preset number of independent wire winding spaces. In the above, the number of the circumferential ridges 131 is not specifically defined, as long as a circumferential side wall of the reel tube 130 can be divided into the preset number of independent wire winding spaces. In an example, the number of the circumferential ridges 131 may be greater than the preset number by one, for example, when the preset number is three, the number of the circumferential ridges 131 is four.

The preset number of the first lamp wires 110 are wound in the preset number of wire winding spaces in one-to-one correspondence, so that the preset number of the first lamp wires 110 are wound as well as collected and released respectively in the independent wire winding spaces, thus avoiding entanglement between different first lamp wires 110, and further improving uniform regularity of winding, collecting and releasing the first lamp wire assembly 11.

In an optional solution of the present embodiment, along the axial direction of the reel tube 130, protruding heights of the circumferential ridges 131 are adapted to dimensions of the first lamp wires 110. That is to say, the protruding heights of the circumferential ridges 131 are adapted to the dimensions of the first lamp wires 110 within a preset tolerance. It is worth emphasizing that the protruding heights of the circumferential ridges 131 and the dimensions of the first lamp wires 110 are both defined on the premise of being in the axial direction of the reel tube 130.

Along the axial direction of the reel tube 130, the positioning rod 132 abuts against the circumferential ridges 131, so that the wire-passing gap formed between the positioning rod 132 and the reel tube 130 is adapted to the dimensions of the first lamp wires 110 along the axial direction of the reel tube 130, and thus the first lamp wires 110 may be wound and positioned in a single layer just by the positioning rod 132.

In an optional solution of the present embodiment, the wire winding mechanism 13 further includes a tubular motor and a coupling assembly. The reel tube 130 is hollow.

The tubular motor and the coupling assembly are both provided inside the reel tube 130, so as to achieve hidden installation of the tubular motor and the coupling assembly, without occupying additional spaces, thereby being conducive to achieving miniaturization of the wire winding mechanism 13.

The coupling assembly is connected to an inner wall of the reel tube 130 in an anti-rotation manner, and an output shaft of the tubular motor is connected to the coupling assembly in an anti-rotation manner, so that when the output shaft of the tubular motor rotates, the reel tube 130 can be driven by the coupling assembly to rotate, thereby implementing electrically controlled lifting of the liftable lighting device 1, and improving convenience of lifting control.

Optionally, as a specific example, the inner wall of the reel tube 130 is provided with a key slot, the coupling assembly includes a connecting column and an anti-rotation sleeve 137, cross section of the output shaft of the tubular motor is in a square shape, the connecting column is provided with a square hole, and the output shaft of the tubular motor is inserted into the square hole of the connecting column, so that the output shaft of the tubular motor is connected to the connecting column in an anti-rotation manner, that is, the output shaft of the tubular motor is connected to the coupling assembly in an anti-rotation manner.

The anti-rotation sleeve 137 is sleeved outside the connecting column and is fixed to the connecting column by a fastener. An outer wall of the anti-rotation sleeve 137 is provided with a key structure. The key structure on the outer wall of the anti-rotation sleeve 137 is adaptively inserted into the key slot in the inner wall of the reel tube 130, so that the coupling assembly is in anti-rotation connection with the reel tube 130.

Certainly, the coupling assembly also may be provided in other structural forms, as long as it can be connected to the inner wall of the reel tube 130 and the output shaft of the tubular motor both in an anti-rotation manner.

In an optional solution of the present embodiment, the wire winding mechanism 13 further includes a threaded rod 135 and a threaded sleeve 136. The threaded rod 135 is provided on the mounting seat 17. The threaded rod 135 may be provided to be immovable relative to the mounting seat 17.

An axis of the threaded rod 135 is coaxial with a rotation axis of the reel tube 130, and the threaded sleeve 136 is screwed to the threaded rod 135. The threaded sleeve 136 is connected to the reel tube 130, so that in the process of rotating with the reel tube 130, the threaded sleeve 136 drives the reel tube 130 to translate along the threaded rod 135. That is to say, the reel tube 130, during rotation, also translates along the threaded rod 135 along with the threaded sleeve 136. Moreover, when a rotation direction of the reel tube 130 is changed, a translation direction of the reel tube 130 along the threaded rod 135 is also changed. Further, when the reel tube 130 collects and releases the first lamp wire assembly 11, collection and release as well as wiring along the axial direction of the reel tube 130 can be synchronously completed, thus avoiding repeated winding at a certain position of the reel tube 130 in the axial direction, thus being beneficial to improving smoothness and stability of the lifting of the lamp body 12.

Optionally, the wire winding mechanism 13 includes a first support seat 133 and a second support seat 134, and the first support seat 133 and the second support seat 134 are both provided with a through hole in a rotation axial direction of the reel tube 130. The threaded sleeve 136 is rotatably provided in the through hole of the first support seat 133, so that the first support seat 133 supports and guides the threaded sleeve 136. The second support seat 134 is used to support one end of the threaded rod 135 away from the reel tube 130.

Optionally, a bearing is provided between the second support seat 134 and the threaded rod 135, and a bearing is provided between the threaded sleeve 136 and the first support seat 133.

It is worth emphasizing that all the power connection rings 150 are all mounted on the threaded sleeve 136, so that the power connection rings 150 and the plate electrode 153 both can synchronously translate along the threaded rod 135 along with the threaded sleeve 136, further ensuring that the two are always kept in contact. Optionally, an innermost power connection ring 150 is externally sleeved outside the threaded sleeve 136, and an insulation ring 151 is provided between the power connection ring 150 and the threaded sleeve 136, so as to ensure that the power connection ring 150 is insulatively mounted on the threaded sleeve 136.

In an optional solution of the present embodiment, the positioning rod 132 includes a positioning shaft 1320, a positioning sleeve 1321 and a flexible casing 1322. The positioning shaft 1320 is provided on the mounting seat 17 and is located on the side portion of the reel tube 130. An axis of the positioning shaft 1320 is parallel to the rotation axis of the reel tube 130. The positioning sleeve 1321 is rotatably sleeved over the positioning shaft 1320. The flexible casing 1322 covers a peripheral side wall of the positioning sleeve 1321.

In this technical solution, the positioning shaft 1320 provides a fixed rotation shaft for rotation of the positioning sleeve 1321. The positioning sleeve 1321 can position the first lamp wires 110 along the radial direction of the reel tube 130. The flexible casing 1322 can form flexible contact with the first lamp wires 110, thus reducing wear to the first lamp wires 110.

Specifically, when the first lamp wires 110 rotate with the reel tube 130, the first lamp wires 110 rub against the flexible casing 1322, thereby driving the positioning sleeve 1321 to rotate around the positioning shaft 1320, so that rolling friction is formed between the first lamp wires 110 and the flexible casing 1322, which can reduce a friction coefficient of the first lamp wires 110, and further reduce wear to the first lamp wires 110.

Optionally, the flexible casing 1322 is made of cloth, silica gel or the like.

Finally, it should be noted that various embodiments in the above are only used to illustrate the technical solutions of the present disclosure, rather than limiting it. Although the present disclosure has been described in detail with reference to various preceding embodiments, those ordinary skilled in the art should understand that they still could modify the technical solutions recorded in various preceding embodiments, or equivalently replace some or all of the technical features therein; and these modifications or replacements do not make the essence of corresponding technical solutions out of the scope of the technical solutions of the embodiments of the present disclosure. Furthermore, those skilled in the art could understand that although some of the embodiments herein include certain features, but not others, included in other embodiments, combinations of features of different embodiments are intended to be within the scope of the present disclosure and form different embodiments. For example, any of the claimed embodiments may be used in any combination. The information disclosed in the section of Background Art is only for enhancement of understanding of the general background of the present disclosure, and should not be regarded as acknowledgment or any form of suggestion that this information forms the prior art already known to those skilled in the art.

What is claimed is:

1. A liftable lighting device, comprising a control assembly, a lamp holder, a lamp body, a first lamp wire assembly, a second lamp wire assembly, a power connection mechanism and a wire winding mechanism, wherein the wire winding mechanism is rotatably provided on the lamp holder, a first end of the first lamp wire assembly is wound on the wire winding mechanism, and a second end of the first lamp wire assembly extends away from the lamp holder, with the lamp body suspended thereto;

the power connection mechanism comprises power connection rings and a plate electrode having at least one elastic sheet group, the power connection rings, and the lamp holder are fixedly arranged relative to each other, and the plate electrode is connected to the wire winding mechanism and is configured to rotate with the wire winding mechanism; and the control assembly is provided on the lamp holder, the second lamp wire assembly is electrically connected to the power connection rings and the control assembly respectively, the at least one elastic sheet group is electrically connected to the first end of the first lamp wire assembly, and the at least one elastic sheet group slidably abuts against the power connection rings.

2. The liftable lighting device according to claim 1, wherein the first lamp wire assembly has a preset number of first lamp wires, and the second lamp wire assembly has second lamp wires of the preset number;

number of the power connection rings is the preset number, all the power connection rings are provided sequentially with one sleeved over and insulated from another from inside to outside, and the at least one elastic sheet group each comprises elastic sheets of the preset number; and the preset number of the second lamp wires are electrically connected to the preset number of the power connection rings in one-to-one correspondence, the preset number of the first lamp wires are electrically connected to the preset number of the elastic sheets in the each elastic sheet group in one-to-one correspondence, and the preset number of the elastic sheets in the each elastic sheet group abut against the preset number of the power connection rings in one-to-one correspondence.

3. The liftable lighting device according to claim 2, wherein an insulation ring is provided between adjacent power connection rings; and each of the power connection rings is provided with a power connection disk, and the second lamp wires are electrically connected to the power connection disk.

4. The liftable lighting device according to claim 2, wherein number of the at least one elastic sheet group is multiple, and the multiple elastic sheet groups are sequentially arranged at intervals along a circumferential direction of the power connection rings; and all elastic sheets and the first lamp wires which are corresponding to a same power connection ring are electrically connected through a circuit on the plate electrode.

5. The liftable lighting device according to claim 2, further comprising an insulation connection seat, wherein the insulation connection seat comprises a first seat portion and a second seat portion;

the first seat portion is connected to the wire winding mechanism, the second seat portion is provided on a side of the first seat portion facing away from the wire winding mechanism, and the plate electrode is connected to the second seat portion;

the insulation connection seat is provided with threading holes of at least the preset number, and the plate electrode is provided with wiring holes of at least the preset number; and end heads of first ends of the preset number of the first lamp wires, after passing through the threading holes, are electrically connected to a circuit of the plate electrode through the preset number of the wiring holes.

6. The liftable lighting device according to claim 2, wherein the wire winding mechanism comprises a mounting seat, a reel tube and a positioning rod;

the mounting seat is provided on the lamp holder, the reel tube and the positioning rod are both rotatably connected to the mounting seat, and the positioning rod is provided spaced from a side portion of the reel tube in a radial direction; and the first end of the first lamp wire assembly is wound on the reel tube and is located between the positioning rod and the reel tube, and the second end of the first lamp wire assembly extends away from the lamp holder, with the lamp body suspended thereto.

7. The liftable lighting device according to claim 6, wherein the reel tube is provided with a plurality of circumferential ridges at intervals in an axial direction, so as to obtain independent wire winding spaces of the preset number;

the preset number of the first lamp wires are wound in the preset number of the wire winding spaces in one-to-one correspondence; and in the axial direction of the reel tube, protruding heights of the circumferential ridges are adapted to dimensions of the first lamp wires, and the positioning rod abuts against the circumferential ridges.

8. The liftable lighting device according to claim 6, wherein the wire winding mechanism further comprises a tubular motor and a coupling assembly; and the reel tube is hollow, the tubular motor and the coupling assembly are both provided inside the reel tube, the coupling assembly is connected to an inner wall of the reel tube in an anti-rotation manner, and an output shaft of the tubular motor is connected to the coupling assembly in an anti-rotation manner.

9. The liftable lighting device according to claim 6, wherein the wire winding mechanism further comprises a threaded rod and a threaded sleeve;

the threaded rod is provided on the mounting seat, an axis of the threaded rod is coaxial with a rotation axis of the reel tube, and the threaded sleeve is screwed over the threaded rod; and the threaded sleeve is connected to the reel tube, and configured to drive, when rotating with the reel tube, the reel tube to translate along the threaded rod.

10. The liftable lighting device according to claim 6, wherein the positioning rod comprises a positioning shaft, a positioning sleeve and a flexible casing; and the positioning shaft is provided on the mounting seat and is located on the side portion of the reel tube, an axis of the positioning shaft is parallel to a rotation axis of the reel tube, the positioning sleeve is rotatably sleeved over the positioning shaft, and the flexible casing covers a peripheral side wall of the positioning sleeve.

* * * * *